SPIRAL PARITY CHECK CHARACTER GENERATING CIRCUIT
Filed April 25, 1962
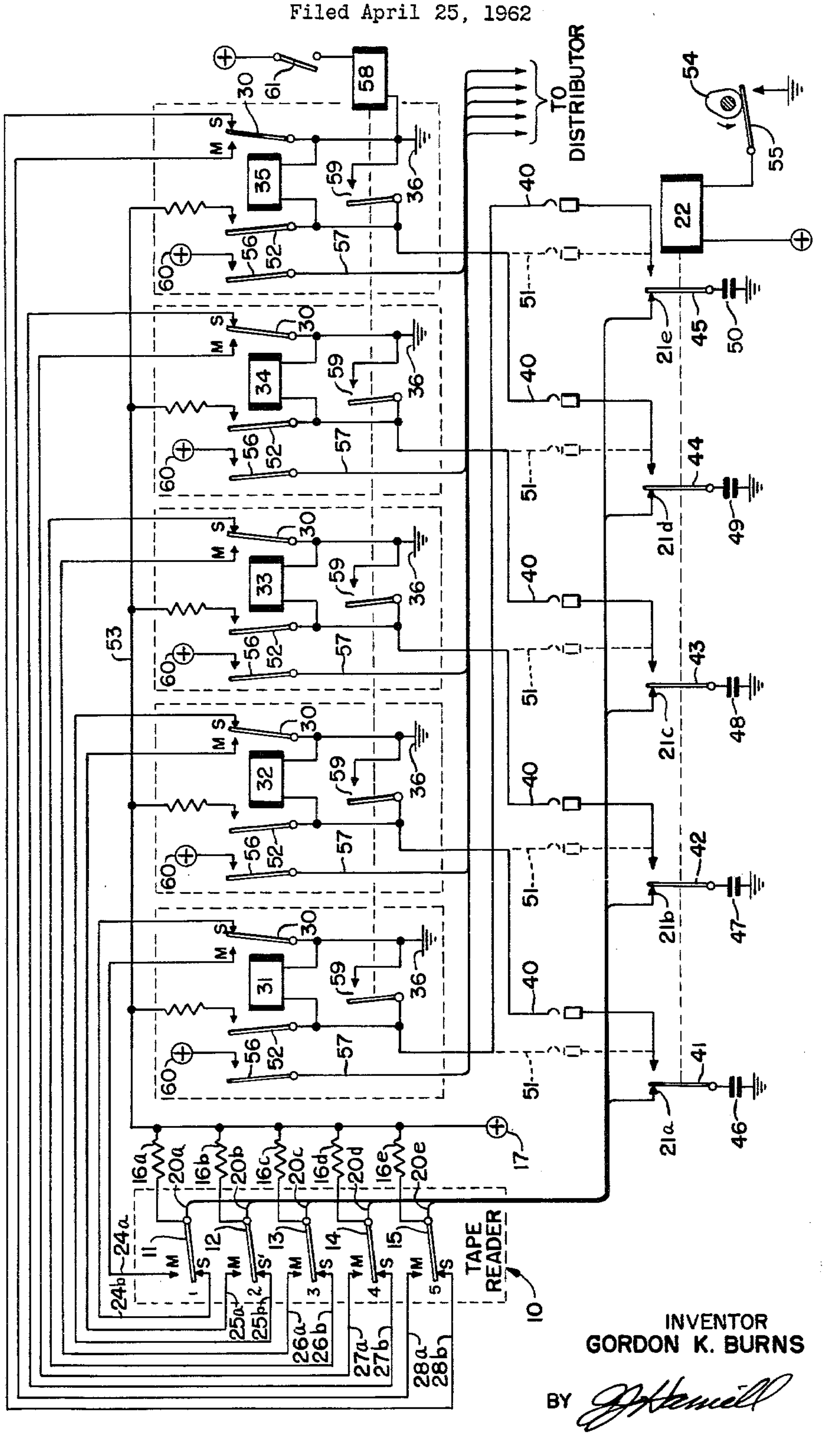
INVENTOR
GORDON K. BURNS
BY [signature]
ATTORNEY 3,234,365

SPIRAL PARITY CHECK CHARACTER GENERATING CIRCUIT

Gordon K. Burns, Mountainside, N.J., assignor to Teletype Corporation, Skokie, Ill., a corporation of Delaware Filed Apr. 25, 1962, Ser. No. 190,042
7 Claims. (Cl. 235—153)

This invention relates to a character generation system, and particularly to a system for generating a character representing a summation of the code elements occupying different elemental positions in successive character codes, which has been called spiral parity check character generation.

Since the advent of electronic computers and the extension of their usefulness by the transmission of the data generated by these computers by telegraphic means to distant stations, horizontal and spiral parity types of error detecting systems have been employed to assure accuracy and fidelity of the transmission.

In so called horizontal parity checking systems elements of one of two conditions, i.e. marking signals or spacing signals (generally the marking signals), in each level of a code combination are counted. The total count, over a given length of message, is compared with the total obtained at a different point in the system for the same length of message, i.e. for the same group of signals. Preferably each of the levels are separately counted and compared simultaneously.

Commonly, a numerical total for a level is not registered, but only the first order of a binary count is registered. Accordingly, if there were two errors in one level, no error would be detected, since the first order of the binary count would be the same for two errors as for no errors. This system is found to be satisfactory where the frequency of errors is low compared to the unit length of the message which is counted and checked. Such a counting system is commonly referred to as an "odd-even" count.

In the so called spiral parity checking system, a shift is made between levels after each code combination whereby the marking signal or spacing signal contained in one level of one code combination is added to the marking or spacing signal of a different level of a succeeding code combination. This total is added to the marking or spacing signal of still another level of the next succeeding character. This process is continued over the entire message. Preferably, similar and separate checks are made for each level of the code combinations. Normally, in spiral parity checking systems, the shift between levels for successive code combinations is a straight numerical shift. Thus, for five level code combinations the numerical shift may be considered as consisting of 1–2–3–4–5–1–2–etc. It will be appreciated, however, that the numerical designations of the levels are arbitrary and that any degree or order of shifting may be employed provided that the shift is such that shifting for a given code combination is uniform for all signals. The shifting or interaction of counts of elements between levels of succeeding code combinations is characteristic of spiral parity check systems whereas the absence of shifting or interacting of counts of elements between levels of succeeding code combinations is characteristic of horizontal parity check systems.

A method of detecting errors by the spiral error detecting system is disclosed in the patent issued to William R. Young, Patent No. 3,008,004, November 7, 1961. The Young patent discloses a particular system for achieving a spirally developed checking character by using a stepping switch to route each of the elements of the permutational telegraphic code combination being monitored to a plurality of binary registering devices, and thereafter moving a stepping switch forward one position so that the elements of a succeeding code combination are routed to binary storage devices associated with different levels and containing counts from these different levels of the prior registered character.

The patent to Edward E. Schwenzfeger, Patent No. 3,008,003, issued November 7, 1961, discloses a spiral parity system for performing an odd-even count of the elements of one condition (marking pulses) by changing the states of bi-stable devices, each of which is associated with an element, during the first half of a character cycle and, then during the latter half of the character cycle by performing a second counting or changing of state operation of the bi-stable devices to include the count of an adjacent bi-stable device. In high speed counting operations, a double operation of a bi-stable device is time consuming and creates timing problems. In the present invention a bi-stable device need change state only once per character cycle and hence is a more simplified system for a timing standpoint. Additionally, the timing components necessary for this double change of state operation are eliminated.

Accordingly, an object of this invention is to provide an improved and simplified method of and apparatus for the spiral parity checking of code elements occupying different elemental positions in successively monitored telegraphic code combinations.

An object of the invention is to perform a spiral parity check by controlling the state of one bi-stable register in accordance with the binary condition of an element of the code combination in a level associated with the one bi-stable register and with the binary condition of an associated bi-stable register.

An object of the invention is to perform a spiral parity check of a plurality of code combinations having binary elements by controlling the state of each of a plurality of registers, one for each level, in accordance with the binary condition of an associated register and the binary condition of an element in a level of the code associated with a register.

An object of the invention is the odd-even spiral counting of the elements of one condition of a telegraph code by adding the binary conditions of an element and a first register in an exclusive "or" gate and then momentarily storing the resultant sum in a storage device prior to transferring of the resultant sum into another related register to record the sum.

An object of the invention is the odd-even addition of the state of the element of a telegraphic code and the state of a corresponding bi-stable register in an exclusive "or" device, and the temporary storage of the resultant sum in a corresponding temporary storage device prior to the transfer of the sum to a register associated with a different level.

Another object of the invention is to provide a parity counting system wherein the resultant sum of the states of the elements of a telegraphic signal and the states of corresponding registers can be temporarily stored for subsequent transfer either to the same register for counting by the horizontal parity method or to a different register for counting by the spiral parity method.

In accordance with the present invention, the condition of an element of a telegraphic code furnishes one input to an exclusive "or" gate associated with a level and the state of an associated register furnishes the other input to the exclusive "or" gate whereby when the element and an associated register are in like states a "0" output is applied to a momentary storage device and whereby when the element and an associated register are in unlike states a "1" output is applied to momentary storage device. The "0" or "1" input applied to the momentary storage device is transferred to a register associated with a different level of the telegraphic code. By transferring the information in the momentary storage device associated with the last level of telegraphic code to the register associated with the first level of the telegraphic code, a closed loop or continual spiral counting may be achieved. Thus, the condition appearing in any register is predicated upon the odd-even addition of previous elements in a spiral manner.

For a more complete understanding of the invention reference may be had to the following detailed description to be interpreted in the light of the accompanying drawing which is a circuit diagram showing a spiral parity system in accordance with the preferred embodiment of the invention. The system is shown in a schematic format with the relays in deenergized or normal condition. During the operation of the system various relays and contacts will operate, and detailed sequences of events for a typical parity check operation will be described hereinafter.

Referring now to the drawing, a tape reader 10, shown in block form, has sensing pins (not shown) to sense the code apertures located in a perforated tape passing over tape sensing pins. Upon the sensing of a perforation in their respective levels, the tape sensing pins move their respective transfer contactors 11–15 from a position at which a contactor engages a spacing contact S to a position at which the contactor engages a marking contact M. If no perforation appears in a given level, the contactor for that level remains in engagement with its spacing contact S. The contactors 11–15 are connected through individual resistors 16A–16E to source of positive potential 17 and are also connected through individual conductors 20A–20E to the back contacts 21A–21E, respectively, of a pulsing relay 22 to provide a path for furnishing positive potential to capacitors 46–50.

Transfer contactors 11–15 are connected by conductors 24A, 24B, 25A, 25B, 26A, 26B, 27A, 27B, and 28A, 28B to the front and back contacts, S and M, respectively, associated with the contactors 30 of the several storage register relays 31–35. Conductors 24A–28A terminate at one end in marking contacts M engageable by the transfer contactors 11–15 and terminate at their other ends with marking contacts M engageable by contactors 30. Similarly, conductors 24B–28B terminate at one end with spacing contacts S engageable by the contactors 11–14 and at their other ends with spacing contacts S engageable by contactors 30. Inasmuch as the contactors 30 continually have ground connection 36 applied thereto, whichever of the contacts M or S is engaged by a contactor 30 has ground potential applied thereto as do both the attached conductor and contact secured to the opposite end of the conductor. Thus, a completed path from ground 36 through one of of the contactors 11–15 to the respective one of the back contacts 21A–21E of relay 22 is established when the contactor 30 and the contactor 11–14 in the same level are both engaging either their marking contacts M or spacing contacts S. Conversely, if a contactor 30 and the contactor 11–14 in the same level are engaging unlike contacts such as mark M and space S, respectively, the contactor of the group of contactors 11–14 is not connected to ground potential, as it is engaging its ungrounded contact.

More specifically, if contactor 30 is engaging its marking contact M and contactor 11 is engaging its spacing contact S, ground potential is applied to the marking contact M on the lead 24A which is not engaged by contactor 11. Conversely, if contactor 30 is engaging its front contact S and contactor 11 is engaging its spacing contact S of its transfer contacts, a path is completed from ground 36 through contactor 30, conductor 24B, contactor 11, conductor 20A, back contact 21A, and swinger 41 to a capacitor 46. The capacitor 46, thus, will be discharged upon the placing of the ground potential 36 thereon, regardless of whether or not the capacitor 46 had been previously charged or discharged at the time of placing of the ground potential 36 on the capacitor 46.

A charging circuit for each of the capacitors 46 to 50 is established from positive potential source 17 unless the respective one of the contactors 11–15 associated with the capacitor is in engagement with or moves into engagement with its associated transfer contact M or S that is grounded through an associated lead and contactor 30. For example, a charging circuit for capacitor 46 in the first level will be established from positive potential 17 through the resistor 16A and the conductor 20A to the back contact 21A and the contactor 41 to the capacitor 46 unless the contactor 11 is connected to ground through whichever of the conductors 24A or 24B is carrying ground potential. Therefore, when the contactor 30 and the associated contactor 11 are interconnected by a conductor such as 24A or 24B, ground potential is placed on the capacitor 46 whereas, when the contactor 30 and the contactor 11 are engaging different conductors such as 24A and 24B, respectively, positive potential 17 is placed on the associated capacitor 46.

The capacitors 46–50 are bi-stable devices in the sense that they are charged either to a positive potential by source 17 or are discharged and at ground potential, and they also are temporary storage devices since their information (charge or discharge) is utilized when universal relay 22 operates once each character cycle and moves its swingers 41–45 to engage their front contacts. When this occurs, the stored information potentials are shifted over leads 40 to the corresponding relays 31–35. A timing cam 54 closes a contact 55 at an appropriate time once each character cycle to energize pulsing relay 22 through an obvious circuit. Relay 22 connects each of the capacitors 46–50 to the winding of either of two associated ones of the binary storage relays 31–35, depending on whether the front contacts of the pulsing relay 22 are connected through a solid line connection 40, to provide spiral system summation, or are connected through the dotted line connection 51, to provide horizontal bit summation, as will be more fully described hereinafter. The energizing circuits for the storage register relays 31–35 are from capacitors 46–50, through swingers 41–45, conductors 40, the coils of the relays to ground 36. Those relays 31–35, that are energized, lock up in a circuit extending from ground 36, the winding of the relays 31–35, locking contactors 52 of relays, now closed, and conductor 53 to positive potential 17.

When a character is sensed by the tape reader 10, the effect of the new information upon capacitors 46–50 is determined by the odd-even addition of the condition of the elements of the new information and the condition of the corresponding relays 31–35, the state of the relays being manifested by the position of their respective contactors 30, i.e. whether a contactor 30 is engaging a front contact S on a back contact M. A relay register is said to be in its "1" condition when energized and its "0" condition when deenergized.

Each pair of front and back contacts M and S engaged by the contactors 30 and the corresponding pair of marking and spacing transfer contacts M and S engaged by their respective contactors 11–15 are interconnected in such a manner as to constitute an exclusive "or" gate since they function in the manner such that like conditions result in capacitors 46–50 receiving a "0" or ground potential and the addition of unlike conditions result in the placing of the positive potential 17 or "1" condition upon the capacitors 46–50.

While capacitors have been employed as the momentary or temporary storage devices for the "0" or "1" condition in the present specification and drawings, relays may be used in lieu of the capacitors, herein employed, to control the energization and deenergization of the storage registers in each level. Hence, it is not contemplated that the invention is limited to the use of capacitors as storage devices.

When relay 22 operates, those capacitors 46 having a charge thereon are switched by relay 22 to furnish a momentary application of current to those relays which are then unoperated and thereafter the self-locking contacts 52 furnish battery to the energized storage relays thus maintaining them in the energized condition when the universal pulsing contacts 41–45 are returned to the rest or normal position. On the other hand, those capacitors in the discharged condition will, upon the closing of the universal pulsing contacts 41–45, momentarily shunt out an energized binary storage relay, thus causing release of the relay. For example, if capacitor 47 is at ground potential when swinger 42 rotates due to energization of relay 22, and if relay 33 is operated and held locked by contactor 52, relay 33 is shunted out through a path extending from ground potential, through capacitor 47, swinger 42 and conductor 40. Of course, the connection of a discharged capacitor to a deenergized relay will leave that relay unoperated.

When the number of characters considered to be a block has been analyzed, the conditions of the binary storage register relays 31–35 correspond to elements of a character, which character is called a partiy check character. The condition of a particular relay is indicated as marking when its parity check contact 56 is closed to apply the positive potential 60 and marking current over conductors 57 to the distributor. When one of the relays 31–35 is unoperated, its parity check contact will be open supplying to the distributor a zero potential and no current, which is a spacing condition. The check character is checked for agreement with the parity check character generated at the receiving station during the receipt of the block of characters. Agreement of check characters signifies that no error had been detected whereas lack of agreement between check characters signifies an error has been detected.

The operation of the spiral parity system can best be understood by considering a detailed example having a plurality of characters. The following description will cover the generation of a spiral check character for three characters having the following elements: First character mark (1), space (0), space (0), mark (1), space (0); second character, mark (1), space (0), mark (1), space (0), mark (1); and third character space (0), mark (1), space (0), space (0), mark (1). Before describing the operation of the operating circuits during the registration of the above three characters, the functional operations of the system during the spiral counting or registering of these three characters will be explained first. Assuming that the register relays 31–35 are all zeroed to their non-energized states, they are recording five spacing or "0" conditions. After adding the elements of the first character to the states of registers 31–35. By Boolean Algebraic Logic in the exclusive "or" gates, the resultant sums are mark, space, space, mark, and space, respectively, and they appear on the capacitors 46–50 as energized, deenergized, deenergized, energized and deenergized. These resultant sums are shifted one place to the right when swingers 41–45 move to engage their front contacts and the registers 31–35 record the shifted code as space, mark, space, space, mark.

Upon the sensing of the second character, viz., mark, space, mark, space, mark by the code reading contacts and after the Boolean algebraic addition thereof with the shifted character, space, mark, space, space, mark in the exclusive "or" gates, the capacitors 46–50 register this addition as mark, mark, mark, space, space which when shifted from the capacitors 46–50 to the relays 31–35 is registered as space, mark, mark, mark, space.

When the third character, which is composed of space, mark, space, space, mark is added to the character registered by the relays 31–35, namely, space, mark, mark, mark, space, the resultant summation is space, space, mark, mark, mark, which, when shifted from the capacitors 46–50 into the register relays 31–35 assumes the form of mark, space, space, mark, mark, which is the parity check character.

This parity check character is generated by following operations of the spiral parity circuitry. In the first character the No. 1 and No. 4 elements are marking and the Nos. 2, 3 and 5 elements are spacing. Sensing of this code will move contactors 11 and 14 into engagement with their respective marking contacts M and leave contactors 12, 13 and 15 in contact with their space contacts S. This results in ground potential being impressed upon the contactors 12, 13 and 15 and positive battery 17 being impressed upon the contactors 11 and 14. The path from ground, which is impressed upon contactors 12, 13 and 15 is through the contactors 30 and the space contacts S associated with relays 32, 33 and 35, respectively. The contactors 11 and 14 engage their mark contacts M and contactors 30 of relays 31 and 34 are engaging their spacing contacts S as relays 31 and 34 are in the unenergized position, and hence ground is not connected to the contactors 11 and 14. Since ground is not on contactors 11 and 14, positive battery 17 applies positive potential through resistors 16A and 16D and conductors 20A and 20D to back contacts 21A and 21D to supply positive charges to capacitors 46 and 49 through contactors 41 and 44, respectively. From the above, it should be apparent that the marking and spacing contacts on the leads extending between contactors 30 and the contactors 11–15 constitute an exclusive "or" gate whereby when the contactors 30 and their associated contactors 11–14 are engaging like contacts a path is completed from ground 36 through contactors 30 to place capacitors 46–50 in discharged condition and that when the contactors 30 and their associated contactors 11–15 are engaging opposite contacts, e.g., mark, space or space, mark, the path between ground 36 and the capacitors 46–50 is interrupted thereby allowing positive potential from source 17 to charge the capacitors 46–50. In this first character contactors 11 and 14 are engaging the marking contacts M and associate register relays 31 and 34 are engaging unlike spacing contacts S, the algebraic addition of these unlike signals in this exclusive "or" gate permits the potential 17 to charge capacitors 46 and 49 associated with these two levels thereby signifying a "1" or mark condition. Also in this first character, contactors 12, 13 and 15 are engaging spacing contacts and contactors 30 associated with relays 32, 33 and 35 likewise are engaging spacing contacts S, the addition of like spacing signals permits ground 36 to be placed on the capacitors 47, 48 and 50 associated with these three levels thereby signifying a "0" or space condition. The above adding is followed by the shifting of these resultant sums into the register associated with the next level.

With the first and fourth capacitors 46 and 49 charged, operation of the swingers 41–45 by universal relay 22 causes capacitors 46 and 49 to discharge over conductors 40 into the binary storage register relays 32 and 35, respectively and operate these relays, which lock operated over a path extending from ground 36 through their left-hand locking contactors 52 and lead 53 to positive potential 17. Capacitors 47, 48 and 50 do not energize the register relays 33, 35 and 31, respectively, because these capacitors are at ground potential.

Thereafter, when the universal pulsing cam 54 revolves a sufficient number of degrees to release the pulsing contact 52, and relay 22, the contactors 41–45 of relay 22 return to their back contacts connected to leads 21A–21E. Soon after this occurs, tape reader 10 retracts the tape sensing pins and advances the tape one character, whereupon the tape sensing pins probe the new character to be read. The condition of the binary storage relays at this moment is that register relay 31 is unenergized, register relay 33 is not energized nor is register 34, and register relays 32 and 35 are energized.

The second code character has elements 1, 3 and 5 marking and elements 2 and 4 spacing. Therefore, contactors 11, 13 and 15 are moved to engage their marking contacts M and contactors 12 and 14 remain in engagement with their spacing contacts S. It will be remembered register relay 31 was not energized following the last character, hence, its contactor 30 is engaging its spacing contacts. The addition of a marking and spacing condition in the first levels permits the capacitor 46 to become charged through a path extending from positive potential 17, resistor 16A, conductor 20A, back contact 21A, and swinger 41. The contactor 12 is engaging its spacing contact S and its associated contactor 30 is engaging the marking contact M, as relay 32 is held energized from the last character. Therefore, the path from ground 36 through swinger 42 is open at contactor 12 which is engaging conductor 25B rather than 25A. Accordingly, positive potential 17 is permitted to be placed on capacitor 47 over a path including resistor 16B, conductor 20B, back contact 21B, and swinger 42. The contactor 13 is engaging the marking contact M and, since register relay 33 is not energized and its contactor 31 is engaging its spacing contact S battery potential 17 appears on swinger 43 to charge the capacitor 48. Contactor 14 is in the spacing condition and, since register relay 34 was not energized during the preceding character, its contactor 30 is engaging its spacing contacts. Ground potential 36 appears on capacitor 49 through a path extending from ground 36, contactor 30, spacing contact S, conductor 27B, spacing contact S, contactor 14, conductor 20D, and back contact 21D, and swinger 44. The fifth contactor 15 is in the marking position and because register relay 35 was energized by the last character, and its contactor 30 is engaging its marking contact M, capacitor 50 is placed at ground potential through a path extending from ground 36, contactor 30, marking contact M, conductor 28A, marking contact M, contactor 15, conductor 20E, and back contact 21E and swinger 45. Thus capacitors 46–50, respectively, are in the following states: charged, charged, charged, uncharged and uncharged.

After the results of these additions appear on the capacitors 46–50, the pulsing cam 54 once again revolves, closing universal contact 55 and energizing universal pulsing relay 22 which causes contactors 41–45 to switch to their front contacts thereby connecting capacitors 46–50 to their associated bit summation conductors 40 which effect the following changes in registers 31–35. Capacitors 46 impresses positive potential on its swinger 41 and conductor 40 and this poistive charge does not affect binary storage register relay 32 which is already energized. Capacitor 47 impresses positive charge on its conductor 40, which charge, when placed upon the previously deenergized register relay 33, energizes register 33. Upon energization of relay 33, its self-locking contact 52 holds the relay 33 energized over a path extending from ground, self-locking contact 52 and lead 53 to positive potential. Capacitor 48 impresses its positive charge on its associated swinger 43 and conductor 40 and energizes previously deenergized relay 34 which locks up over a path similar to that for relay 33. Capacitor 49 impresses ground potential on its associated swinger 44 and lead 40 and thus momentarily shunts energized relay 35 over a path extending from capacitor 49, swinger 44, conductor 40, contactor 47 and lead 53 to positive potential 17. This shunting causes register relay 35 to release. The capacitor 50 has ground potential impressed upon it, and, when this ground potential is transferred over the conductor 40 leading to register relay 31, relay 31 will remain unoperated.

After having shifted the resultant summations stored upon capacitors 46–50 one level or register to the right to effect a spiral parity count, relays 31–35 are in the following conditions: relay 31 is unoperated, relay 32 is operated, relay 33 is operated, relay 34 is operated, and relay 35 is unoperated.

The third character has elements 1, 3 and 4 spacing and elements 2 and 5 marking. Adding the spacing condition of unenergized relay 31 to the spacing condition shown by contactor 11 engaging spacing contact S, a path is completed from ground 36 to place capacitor 46 in discharged position. Capacitor 47 is not charged due to the addition of the marking condition of contactor 12 and the energized condition of relay 32, which addition connects ground 36 to this capacitor 47. Capacitor 48 becomes charged due to the addition of unlike signals, namely, the spacing condition of contactor 13 and the marking condition of contactor 30 of relay 33 thereby permitting positive potential 17 to be placed on capacitor 48. Capacitor 49 also becomes charged due to addition of the spacing condition of the contactor 14 and the energized state of register relay 34. Capacitor 50 associated becomes charged due to addition of the marking condition of the code character 15 and the nonenergized state of register relay 35.

Accordingly, when pulsing contacts 55 are closed due to the action of the universal cam 54 the following shifts will take place: Register relay 31, which was unoperated, will be operated by the charge of capacitor 50 through a path extending from capacitor 50, swinger 45, conductor 40 and the coil of relay 31 to ground 36. The locking path is, of course, from ground 36, coil of relay 31, locking contactor 52, and conductor 53 to positive potential 17. Register relay 32, previously in the operated condition, will now be shunted and released. The shunting path is from the ground potential on capacitor 46 and over conductor 40. Register relay 33 previously in the operated condition will now be shunted and released due to ground potential existing on capacitor 47, the shunt path being similar to the shunt path traced for register relay 32 above. Register relay 34 previously in the operated condition will remain operated as there is a charge on the capacitor 48. Register relay 35 previously in the nonenergized condition will now be energized due to the charged condition of capacitor 49, the charging path being from capacitor 49, swinger 44, conductor 40, and coil of relay 35, to ground 36. The state of the binary storage register relays 31–35 are now as follows: Energized, not energized, not energized, energized, energized, which correspond to mark, space, space, mark, and mark elements of a parity check character.

When the number of characters considered to be a block have been counted, the binary storage register relays 31–35 contain the intelligence representing the parity check character. While binary registers similar to those shown in the drawings are provided at both the transmitting and receiving stations and a read out of their respective parity check characters is obtained, the binary registers 31–35 are designated as those at the transmitting station. Accordingly, the binary conditions read out of registers 31–35 go to a sequential distributor (not shown) for transmission over a transmission channel to the receiving station. Parity check character contacts 56 of the storage register relays 31–35 apply the marking and spacing elements of the check character to the parity character leads 57. Those relays in the energized condition will have their parity check contactor 56 connected to battery 60 to furnish the line with current indicating a marking condition, whereas those relays not energized have their contactors 56 open indicating a no current or spacing condition.

The receiver has equipment which may be of conventional design for comparing the parity check characters and if they are not alike the occurrence of an error is indicated, and procedures will be employed to effect retransmission of the block of characters to correct the error. Incident to the transmission of the check character, it is a preferred practice to release those of the register relays that are operated, in order that the binary storage register shall be in a standard or normal condition at the beginning of each block of characters. This may be accomplished by the closure of a reset switch 61 to energize a reset relay 58 to close its make contacts 59 which shunt the windings of the energized relays over a path extending from ground connection 36, and make contacts 59, now closed. Thus, the previously energized relays release and join those of the relays that were deenergized so that at the beginning of the next block all of the relays are deenergized.

The selectively determinable parity conductors 40 are employed to extend the flexibility of the system from the standpoint of the type of parity system employed. It is known in the art that a spiral checking system is a more reliable method than the horizontal method of assuring fidelity and accuracy in the analyzing of a block of characters, particularly in the detection of errors that tend to recur in the same level or elements of the code, in this connection, see the aforementioned Young patent. However, occasion may arise wherein the horizontal parity checking system may be used to almost equal advantage, e.g., when combined with a vertical parity check system.

As previously set forth, the connections 51 from the transfer swingers 41–45 to the binary register relays 31–35 provided for horizontal bit summation. This will be apparent when it is observed that each of the registers 31–35 would be associated by their respective leads 51 with only a single level of the code combinations, and likewise each of the capacitors 46–50 would be associated with only one level. For example, relay 31 is associated only with transfer contact 11 in the first level and capacitor 46 is associated only with relay 31 rather than both relays 31 and 32. It is this absence of interaction, i.e., transferring or shifting, of information that is characteristic of horizontal parity systems, and conversely, it is the interaction among levels that is characteristic of spiral parity checking systems. If desired, a switch may be added to the circuit to quickly change back and forth between spiral and horizontal bit summation.

From the foregoing description it is believed to be apparent that the present spiral parity system registers the odd-even count in bi-stable registers and controls the state of each register in accordance with the binary condition of an associated register and the binary condition of an element of an associated level. More specifically, for instance, relay 32 is controlled in accordance with the binary condition (energized or deenergized) of relay 31 and the binary condition of the code element in the second level of the code combination.

Furthermore, it should be apparent that each of the relays 31–35 is associated with two levels of the code combinations since each relay registers the count of one level and affects the count of a relay in another level. For example, relay 32 is associated with the second level of the code combinations in that its contactor 56 registers the odd-even count for the second level, and is associated with the third level of the code combinations in that the position of its contactor 30 affects the condition of capacitor 42 and ultimately the state of relay 33. Conversely, it is considered that each level of the code combination is associated with two registers, namely, the level containing the relay to which the binary condition of the element is added and the level containing the relay which is controlled by the addition. More specifically, the second level of the code combination is associated with relay 32 since the condition of the element in level two is added to the condition of relay 32, and the second level of the code combination is related to relay 33 since the condition of the element in level two is a factor in the change or no change of relay 33.

With this interrelationship in mind, it is believed to be apparent that the method herein practiced involves the steps of determining the binary condition of a first relay, determining the binary condition of an element in an associated level and controlling the state of an associated relay in accordance with these binary conditions.

Although only one embodiment of the invention is shown in the drawings and described in the foregoing specification it will be understood that invention is not limited to the specific embodiment described but is capable of modification and rearrangement and substitution of parts and elements without departing from the spirit of the invention.

What is claimed is:

1. Apparatus for spirally odd-even counting the binary condition of elements of a telegraph code in a plurality of odd-even registers corresponding to and equal in number to the number of levels of a character of the telegraph code, said apparatus comprising means for performing an odd-even summation of the binary condition of an element in a first level and the count in a first of said registers, a momentary storage device, means for applying the output of the odd-even summation means as a first potential to said momentary storage device when the binary conditions of said first register and said element are alike and for applying the output of the odd-even summation means as a second potential to said momentary storage device when the binary conditions of said first register and said element are unlike, and means for controlling a second of said registers in accordance with the momentarily stored potential in said momentary storage device.

2. Apparatus for registering an odd-even spiral check count of code elements of one type contained in a plurality of permutative binary character codes, said apparatus comprising a plurality of registers, one for each level of the code, first control means responsive to the type of code element contained in one level of the code at a given time for providing an output indicative of the presence or absence of said one type of code element, second control means responsive to the output of a first one of the registers for providing an output indicative of the odd-even count of code elements of said one type in said first register, and means responsive to the outputs of said first and said second control means for causing a second one of said registers to register the odd-even summation of the code element and the count contained in said first register.

3. Apparatus for registering an odd-even spiral parity check count of code elements of one type contained in a plurality of permutative binary character codes, said apparatus comprising a plurality of registers, one for each level of the code, a plurality of first control means one for each level of the character code, each of said first control means being responsive to the type of code element contained in a corresponding level of the code at a given time for providing an output indicative of the presence or absence of said one type of code element, a plurality of second control means one for each level of the character code, each of second control means being responsive to the output of one of the registers for providing an output indicative of the odd-even count of code elements of said one type in said one register, and a plurality of third control means one for each level of the character code, each of said third control means being responsive to the outputs of said first and second control means for causing another one of said registers to register the odd-even summation of the code element and the count contained in said one register.

4. Apparatus for spirally counting binary elements of one condition contained in a plurality of permutative code combinations, said apparatus comprising a bi-stable register for each level of the code for registering an odd-even count in each level, each register counting by alternating between a first bi-stable state and a second bi-stable state, an exclusive "or" gate means for adding the condition of an element in each level and the condition of a corresponding bi-stable register to obtain an output representative of an odd-even summation of said conditions and a plurality of bi-stable devices each connected to the output of an exclusive "or" gate means for temporarily storing said odd-even summation, and means for controlling the condition of a bi-stable register corresponding to a different level in response to the output of each of said bi-stable devices.

5. A spiral parity apparatus for counting one condition of binary elements of telegraphic code combinations comprising a plurality of bi-stable registers equal in number to the number of levels in said code combinations, each register registering an odd-even count by alternating between a first stable state and a second stable state, an exclusive "or" gate means for summing said one condition of an element in each level and the count of a corresponding register, a plurality of bi-stable devices, each connected to the output of an exclusive "or" gate means for storing the summation furnished by that exclusive "or" gate means, and timing means for causing the output of each of said bi-stable devices to control the count of another bi-stable register.

6. Apparatus for spirally counting the elements of one of two conditions of succeeding code combinations having a plurality of levels comprising a plurality of relays each corresponding to a different level of and each registering an odd-even count of the elements of said one condition by alternating between an energized and a deenergized state, a plurality of capacitors, a plurality of exclusive "or" gate means, each for adding the condition of the odd-even element in a particular level and the corresponding count of the relay, each of said exclusive "or" gate means charging a corresponding one of said capacitors when the condition and count being added are unlike, and discharging said corresponding capacitor when the condition and count being added are alike, and timing means for causing said capacitor to control the state of a different one of said relays.

7. Apparatus for performing a spiral odd-even counting of one of the binary elements of a plurality of code combinations comprising a plurality of bistable registers each corresponding to a different level of the code combinations and each registering an odd-even count by alternating between a first stable state and a second stable state, a plurality of capacitors, a plurality of exclusive OR-gate means each being supplied with an input from a different level of the code combinations and with an input from a corresponding first register for applying a first potential to a corresponding capacitor when the count of an element being added to the count of its corresponding first register is alike and for applying a second potential when the counts being added are unlike, and means for connecting each capacitor to a second register to cause the count stored in said second register to correspond to the count represented by the potential stored by said capacitor.

References Cited by the Examiner

UNITED STATES PATENTS

| | | | |
|---|---|---|---|
| 3,008,003 | 11/1961 | Schwenzfeger ------ | 178—23.1 |
| 3,008,005 | 11/1961 | Barry et al. ---- | 340—146.1 X |

ROBERT C. BAILEY, *Primary Examiner.*

MALCOLM A. MORRISON, *Examiner.*